United States Patent
Colson et al.

(10) Patent No.: US 10,829,241 B2
(45) Date of Patent: Nov. 10, 2020

(54) STRUCTURALLY IMPROVED RAM FAN INLET SHROUD

(71) Applicant: Hamilton Sundstrand Corporation, Charlotte, NC (US)

(72) Inventors: Darryl A. Colson, West Suffield, CT (US); Thomas E. Vatter, Holyoke, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 156 days.

(21) Appl. No.: 15/944,034

(22) Filed: Apr. 3, 2018

(65) Prior Publication Data

US 2019/0300197 A1 Oct. 3, 2019

(51) Int. Cl.
| | |
|---|---|
| B65D 41/00 | (2006.01) |
| B64D 41/00 | (2006.01) |
| F01D 9/04 | (2006.01) |
| F01D 25/24 | (2006.01) |
| F04D 25/06 | (2006.01) |
| F04D 29/58 | (2006.01) |
| B64D 13/06 | (2006.01) |
| F04D 19/00 | (2006.01) |

(52) U.S. Cl.
CPC ........... B64D 41/007 (2013.01); B64D 13/06 (2013.01); F01D 9/04 (2013.01); F01D 25/24 (2013.01); F04D 19/00 (2013.01); F04D 25/06 (2013.01); F04D 29/5806 (2013.01); B64D 2013/0611 (2013.01); B64D 2013/0618 (2013.01); F05D 2220/34 (2013.01); F05D 2240/12 (2013.01); F05D 2240/14 (2013.01)

(58) Field of Classification Search
None
See application file for complete search history.

(56) References Cited

U.S. PATENT DOCUMENTS

| | | | | |
|---|---|---|---|---|
| 8,459,966 | B2 * | 6/2013 | Hipsky | B64D 13/00 417/325 |
| 9,556,885 | B2 * | 1/2017 | Beers | F04D 29/329 |
| 9,638,199 | B2 | 5/2017 | Beers et al. | |
| 2014/0056718 | A1 | 2/2014 | Beers et al. | |
| 2014/0321995 | A1 | 10/2014 | Beers et al. | |

FOREIGN PATENT DOCUMENTS

EP 3290714 A1 3/2018

OTHER PUBLICATIONS

The Extended European Search Report for Application No. 19167072.8-1010; dated Aug. 26, 2019; Report Received Date: Aug. 28, 2019; 8 pages.

* cited by examiner

Primary Examiner — Igor Kershteyn
Assistant Examiner — Juan G Flores
(74) Attorney, Agent, or Firm — Cantor Colburn LLP

(57) ABSTRACT

According to one embodiment, a ram air fan inlet shroud for a ram air fan assembly of an aircraft is provided. The ram air fan inlet shroud including: a shroud portion extending outwardly from a conical portion, the conical portion providing a transition between a central portion and an inner ram air fan hub interface portion, the conical portion including a plurality of inner cooling holes, a diameter of each of the plurality of inner cooling holes is about 0.406 inches (1.031 cm); and a recessed portion located between the inner ram air fan hub interface portion and an outer ram air fan hub interface portion, the recessed portion including a plurality of outer cooling holes.

20 Claims, 5 Drawing Sheets

STRUCTURALLY IMPROVED RAM FAN INLET SHROUD

BACKGROUND

The subject matter disclosed herein generally relates to the field of aircraft environmental control, and more particularly to an inlet shroud of a ram air fan for an aircraft environmental control system.

Many types of aircraft use ram air flow for various purposes, such as in cooling systems for the aircraft. For example, the ram air flow may be utilized to remove heat from various aircraft lubrication and electrical systems and/or used to condition aircraft cabin air. When the aircraft is in flight, movement of the aircraft creates a sufficient source of ram air flow which can be used for the purposes described above. When the aircraft is on the ground or is operating at low speeds, a ram air fan is typically utilized to increase air flow to the cooling systems. Such a ram air fan is driven by an electric motor which, in turn, must be cooled by air flowing across it. Cooling flow is drawn at a heat exchanger inlet and across the electric motor to a ram air fan inlet. The flow of cooling air, and thus the performance of the electric motor and ram air fan, is typically limited by a pressure drop from the heat exchanger inlet to the ram air fan inlet. A balance must be achieved between this pressure drop, which can impact heat exchanger performance, and providing sufficient cooling flow to the electric motor and other components of a ram air fan assembly.

BRIEF SUMMARY

According to one embodiment, a ram air fan inlet shroud for a ram air fan assembly of an aircraft is provided. The ram air fan inlet shroud including: a shroud portion extending outwardly from a conical portion, the conical portion providing a transition between a central portion and an inner ram air fan hub interface portion, the conical portion including a plurality of inner cooling holes, a diameter of each of the plurality of inner cooling holes is about 0.406 inches (1.031 cm); and a recessed portion located between the inner ram air fan hub interface portion and an outer ram air fan hub interface portion, the recessed portion including a plurality of outer cooling holes.

In addition to one or more of the features described above, or as an alternative, further embodiments may include that each of the plurality inner cooling holes includes a hole centerline oriented at an angle of about 35° relative to the inner ram air fan hub interface portion.

In addition to one or more of the features described above, or as an alternative, further embodiments may include: a ram air fan inlet shroud centerline; and a first angled wall within the conical portion, the first angled wall being located opposite the recessed portion, the first angled wall is oriented at an angle of about 50° relative to the ram air fan inlet shroud centerline.

In addition to one or more of the features described above, or as an alternative, further embodiments may include: a ram air fan inlet shroud centerline; a first angled wall within the conical portion, the first angled wall being located opposite the recessed portion; and a first reference point located on the first angled wall at a distance of about 1.275 inches (3.239 cm) away from the ram air fan inlet shroud centerline.

In addition to one or more of the features described above, or as an alternative, further embodiments may include: a ram air fan inlet shroud centerline; a first angled wall within the conical portion, the first angled wall being located opposite the recessed portion; and a first reference point located on the first angled wall at a distance of about 0.530 inches (1.346 cm) away from the inner RAF hub interface portion as measured linearly along the ram air fan shroud centerline.

In addition to one or more of the features described above, or as an alternative, further embodiments may include: a ram air fan inlet shroud centerline; a second angled wall within the conical portion, the second angled wall being located on a side of the ram air fan inlet shroud that includes the recessed portion; and a second reference point located on the second angled wall, the second angled wall at the second reference point is oriented at an angle of about 55° relative to the ram air fan inlet shroud centerline.

In addition to one or more of the features described above, or as an alternative, further embodiments may include: a ram air fan inlet shroud centerline; a second angled wall within the conical portion, the second angled wall being located on a side of the ram air fan inlet shroud that includes the recessed portion; and a second reference point located on the second angled wall, the second reference point is located at a distance of about 0.550 (1.397 cm) away from the inner ram air fan hub interface portion as measured linearly along the ram air fan shroud centerline.

In addition to one or more of the features described above, or as an alternative, further embodiments may include that each of the plurality inner cooling s holes further comprises: an outlet located in the conical portion, the outlet is located at a distance of about 0.785 inches (1.994 cm) away from the ram air fan hub interface portion as measured linearly along the ram air fan shroud centerline.

In addition to one or more of the features described above, or as an alternative, further embodiments may include that the central portion is located at a distance of about 0.625 inches (1.588 cm) away from the inner ram air fan hub interface portion.

In addition to one or more of the features described above, or as an alternative, further embodiments may include: a ram air fan inlet shroud centerline; a second angled wall within the conical portion; and a second reference point located on the second angled wall, the second reference point is located at a distance of about 0.7 inches (1.778 cm) away from the ram air fan inlet shroud centerline.

According to another embodiment, a ram air fan assembly is provided. The ram air fan assembly including: a ram air fan disposed at a fan inlet, the ram air fan including a ram air fan hub coupled to a plurality of fan blades; a ram air fan motor operably connected to the ram air fan; and a ram air fan inlet shroud disposed proximate to the ram air fan hub, the ram air fan inlet shroud including: a shroud portion extending outwardly from a conical portion, the conical portion providing a transition between a central portion and an inner ram air fan hub interface portion, the conical portion including a plurality of inner cooling holes, a diameter of each of the plurality of inner cooling holes is about 0.406 inches (1.031 cm); and a recessed portion located between the inner ram air fan hub interface portion and an outer ram air fan hub interface portion, the recessed portion including a plurality of outer cooling holes.

In addition to one or more of the features described above, or as an alternative, further embodiments may include that each of the plurality inner cooling holes includes a hole centerline oriented at an angle of about 35° relative to the inner ram air fan hub interface portion.

In addition to one or more of the features described above, or as an alternative, further embodiments may include: a ram air fan inlet shroud centerline; and a first angled wall within the conical portion, the first angled wall being located opposite the recessed portion, the first angled wall is oriented at an angle of about 50° relative to the ram air fan inlet shroud centerline.

In addition to one or more of the features described above, or as an alternative, further embodiments may include: a ram air fan inlet shroud centerline; a first angled wall within the conical portion, the first angled wall being located opposite the recessed portion; and a first reference point located on the first angled wall at a distance of about 1.275 inches (3.239 cm) away from the ram air fan inlet shroud centerline.

In addition to one or more of the features described above, or as an alternative, further embodiments may include: a ram air fan inlet shroud centerline; a first angled wall within the conical portion, the first angled wall being located opposite the recessed portion; and a first reference point located on the first angled wall at a distance of about 0.530 inches (1.346 cm) away from the inner RAF hub interface portion as measured linearly along the ram air fan shroud centerline.

In addition to one or more of the features described above, or as an alternative, further embodiments may include: a ram air fan inlet shroud centerline; a second angled wall within the conical portion, the second angled wall being located on a side of the ram air fan inlet shroud that includes the recessed portion; and a second reference point located on the second angled wall, the second angled wall at the second reference point is oriented at an angle of about 55° relative to the ram air fan inlet shroud centerline.

In addition to one or more of the features described above, or as an alternative, further embodiments may include: a ram air fan inlet shroud centerline; a second angled wall within the conical portion, the second angled wall being located on a side of the ram air fan inlet shroud that includes the recessed portion; and a second reference point located on the second angled wall, the second reference point is located at a distance of about 0.550 (1.397 cm) away from the inner ram air fan hub interface portion as measured linearly along the ram air fan shroud centerline.

In addition to one or more of the features described above, or as an alternative, further embodiments may include that each of the plurality inner cooling holes further comprises: an outlet located in the conical portion, the outlet is located at a distance of about 0.785 inches (1.994 cm) away from the ram air fan hub interface portion as measured linearly along the ram air fan shroud centerline.

In addition to one or more of the features described above, or as an alternative, further embodiments may include that the central portion is located at a distance of about 0.625 inches (1.588 cm) away from the inner ram air fan hub interface portion.

According to another embodiment, a method of installing a ram air fan inlet shroud in a ram air fan assembly is provided. The method including: arranging the ram air fan inlet shroud proximate to a ram air fan hub coupled to a plurality of fan blades configured to extend at least partially across a ram air fan inlet of the ram air fan assembly; positioning a tie rod through the ram air fan inlet shroud and the ram air fan hub along a ram air fan centerline within an interior portion of a ram air fan shaft; and establishing a plurality of flow paths for a cooling flow in the ram air fan assembly including through a plurality of inner cooling holes and outer cooling holes in the ram air fan inlet shroud, the ram air fan inlet shroud further comprises: a shroud portion extending outwardly from a conical portion, the conical portion providing a transition between a central portion and an inner ram air fan hub interface portion, the conical portion including a plurality of inner cooling holes, a diameter of each of the plurality of inner cooling holes is about 0.406 inches (1.031 cm); and a recessed portion located between the inner ram air fan hub interface portion and an outer ram air fan hub interface portion, the recessed portion including a plurality of outer cooling holes.

Technical effects of embodiments of the present disclosure include improving flow aerodynamics while simultaneously increasing the strength of ram fan inlet shroud by adjusting dimensions of cooling holes and the material around cooling holes.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
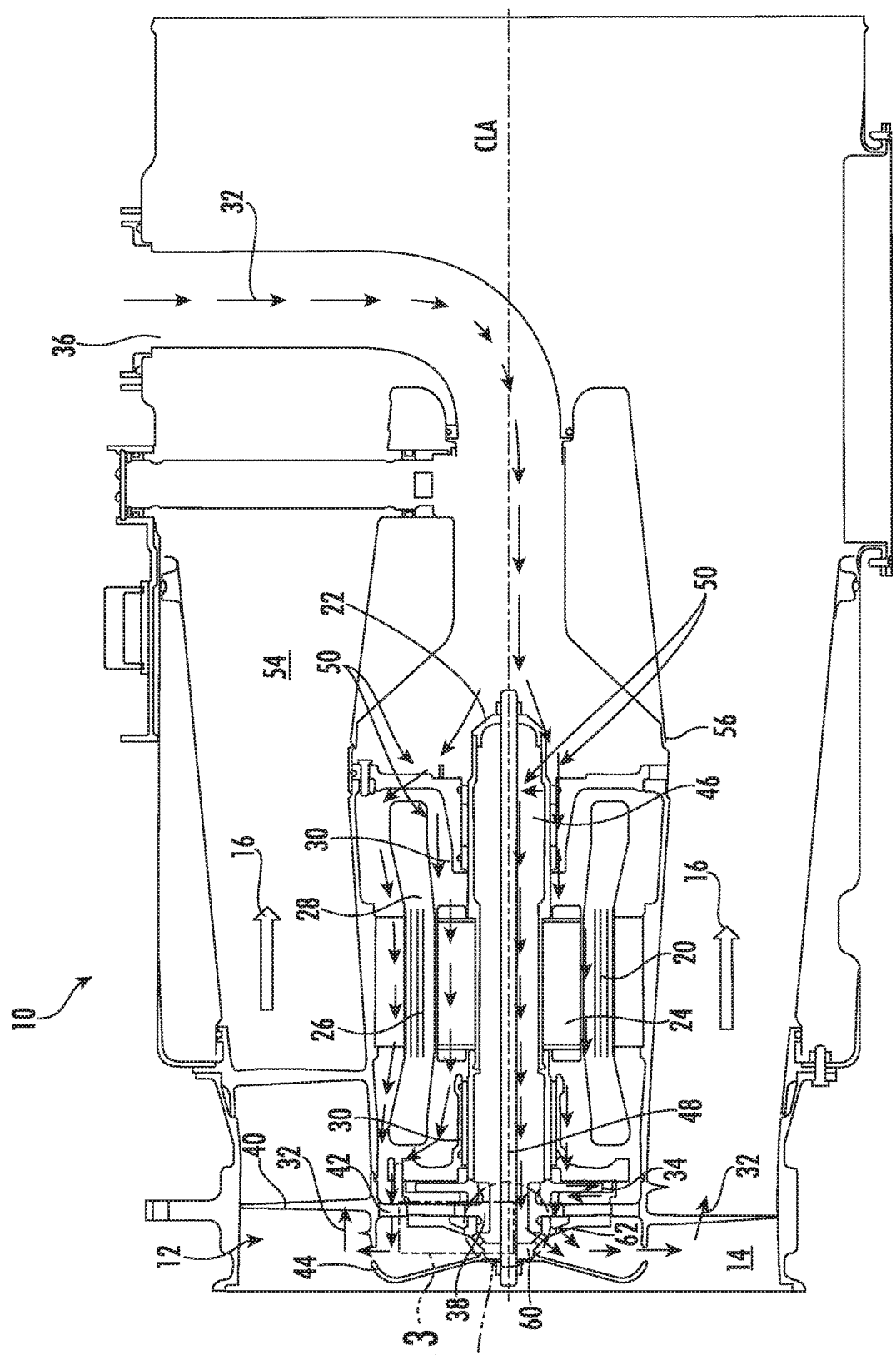
FIG. 1 illustrates a cross-sectional view of a ram air fan assembly including a ram air fan inlet shroud, according to an embodiment of the present disclosure.

Shown in FIG. 1 is a view of a ram fan assembly 10 for an aircraft environmental control system (ECS). The ram fan assembly 10 includes a ram air fan (RAF) 12 located at a RAF inlet 14. A ram air flow 16 flows into the RAF inlet 14 from a heat exchanger (not depicted) and through a fan passage 54 and is exhausted overboard.

The RAF 12 includes fan blades 40 that are coupled to a RAF hub 38, where the RAF hub 38 is operably connected to a RAF motor 20 via a RAF shaft 22. The RAF motor 20, located in a motor housing 56, is an electric motor having a rotor 24 rotatably located at the RAF shaft 22, and a stator 26 having a plurality of stator windings 28 disposed radially outboard of the rotor 24. The RAF motor 20 also includes one or more journal bearings 30 disposed at the RAF shaft 22. The RAF 12 and RAF motor 20 are typically utilized to urge additional air flow 16 through the RAF inlet 14 when natural airflow 16 into the RAF inlet 14 is not sufficient to meet airflow requirements.

To prevent overheating of the RAF motor 20, particularly the stator windings 28, the journal bearings 30, and one or more thrust bearings 34, a cooling flow 32 is drawn through the motor housing 56 across the RAF motor 20. The cooling flow 32 is drawn through an inlet header 36. The cooling flow 32 proceeds through a plurality of flow paths 50 that include flow across the journal bearings 30, stator windings 28, stator 26, and rotor 24 to remove thermal energy therefrom. The flow paths 50 allow the cooling flow 32 to pass through a plurality of cooling openings 42 in a RAF hub 38 and egress from the RAF motor 20 toward the RAF inlet 14.

The cooling flow 32 is also routed by flow paths 50 in proximity to the thrust bearings 34. Additionally, the cooling flow 32 in the flow paths 50 enters an interior portion 46 of the RAF shaft 22 that includes a tie rod 48 positioned along a ram air fan centerline (CLA). The cooling flow 32 in the flow paths 50 also passes through a plurality of inner cooling holes 60 and outer cooling holes 62 of a RAF inlet shroud 44 toward the RAF inlet 14. The RAF inlet shroud 44 is disposed proximate to the RAF hub 38. In an embodiment, the inner cooling holes 60 are configured to receive of portion of the cooling air 32 that passes through the interior portion 46 of the RAF shaft 22, while the outer cooling holes 62 are configured to receive a portion of the cooling flow 32 that cools the thrust bearings 34.

The cooling flow 32 enters the RAF inlet 14 between the RAF inlet shroud 44 and the fan blades 40 that are coupled to the RAF hub 38 to mix with the airflow 16. The cooling flow 32 is driven generally via a pressure differential between the inlet header 36 and the RAF inlet 14 and the configuration of the flow paths 50.

Figure 2:
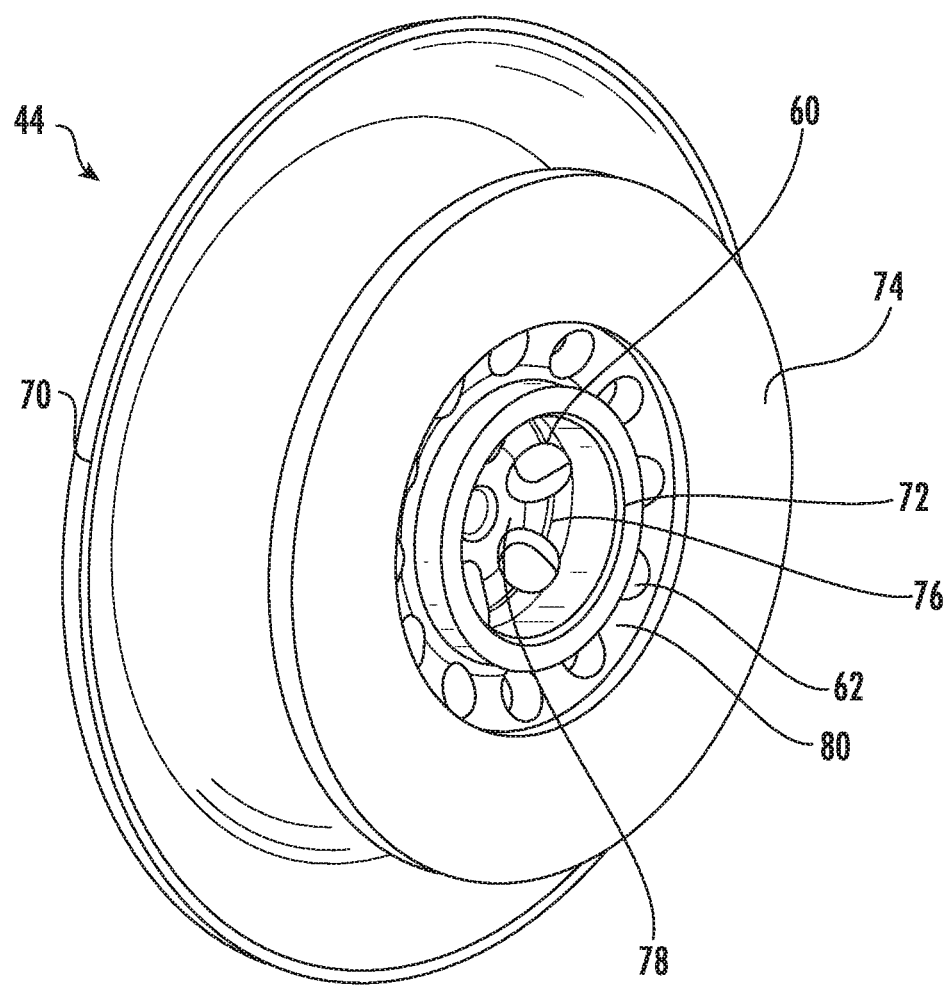
FIG. 2 illustrates a perspective view of the ram air fan inlet shroud of FIG. 1, according to an embodiment of the present disclosure.

Referring now to FIG. 2, with continued reference to FIG. 1. FIG. 2 is a perspective view of an embodiment of the RAF inlet shroud 44 of FIG. 1. The RAF inlet shroud 44 includes a shroud portion 70, an inner RAF hub interface portion 72, an outer RAF hub portion 74, a conical portion 76, a central portion 78, and a recessed portion 80. The conical portion 76 of the RAF inlet shroud 44 provides a transition between the inner RAF hub interface portion 72 and the central portion 78 of the RAF inlet shroud 44. The shroud portion 70 extends outwardly from the conical portion 76 of the RAF inlet shroud 44. The recessed portion 80 is located between the inner RAF hub interface portion 72 and the outer RAF hub portion 74, which gives the inner RAF hub interface portion 72 an annular appearance. The inner cooling holes 60 are located in the conical portion 76 of the RAF inlet shroud 44, and the outer cooling holes 62 are located in the recessed portion 80 of the RAF inlet shroud 44. As can be seen in FIG. 2, each of the inner cooling holes 60 and each of the outer cooling holes 62 are substantially round. The number, sizing, and placement of the inner cooling holes 60 and the outer cooling holes 62 assist in optimizing the cooling flow 32 of FIG. 1, and thereby improve performance of the RAF assembly 10 of FIG. 1 and associated aircraft ECS.

Figure 3:
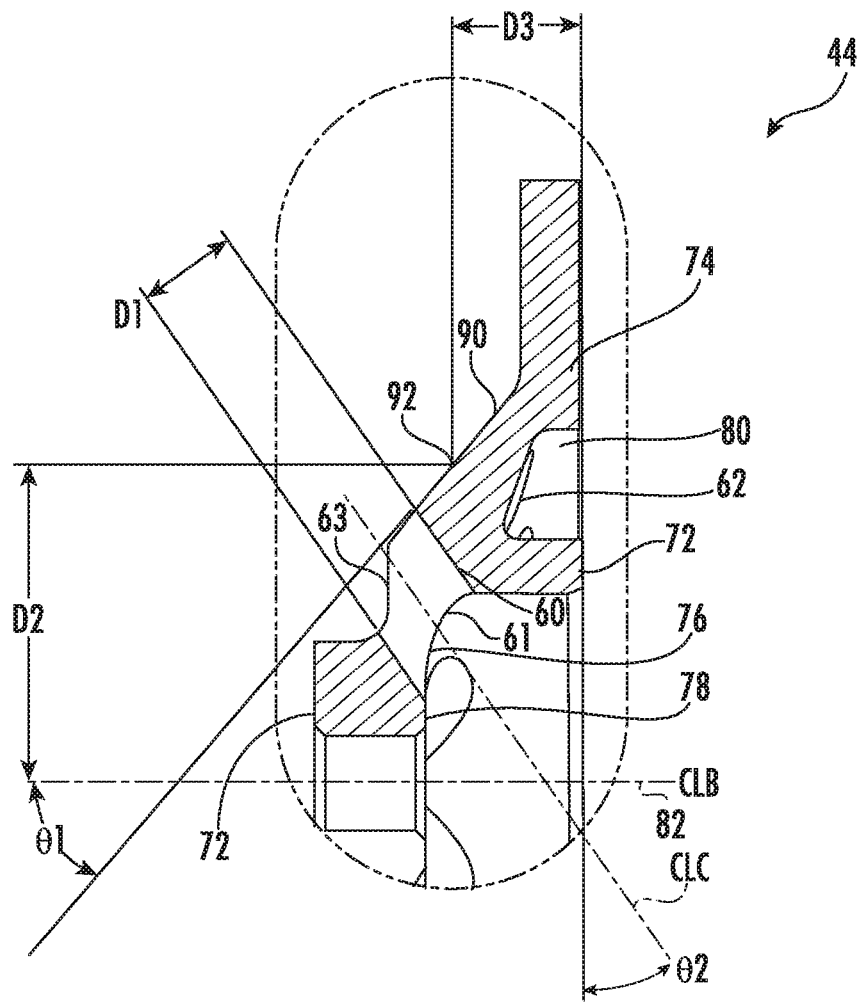
FIG. 3 illustrates an enlarged cross-sectional view of the ram air fan assembly of FIG. 1, according to an embodiment of the present disclosure.
Figure 4:
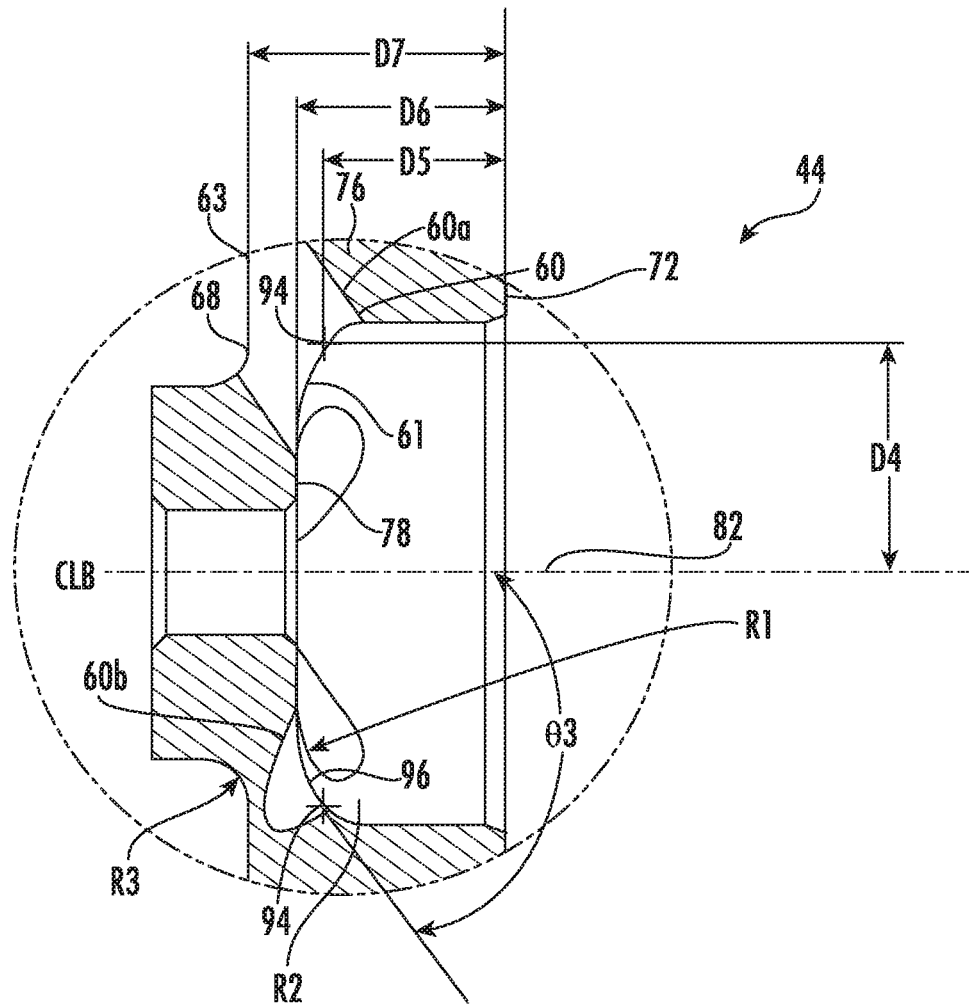
FIG. 4 illustrates an enlarged cross-sectional view of the ram air fan assembly of FIG. 1, according to an embodiment of the present disclosure.

Referring now to FIG. 3, with continued reference to FIGS. 1-2. FIG. 3 is an enlarged view of the sectional view of FIG. 1. FIG. 3 illustrates the RAF inlet shroud 44 about a RAF inlet shroud centerline (CLB) along the axial center 82 of the RAF inlet shroud 44 proximate the central portion 78. The inner cooling holes 60 in the conical portion 76 of the RAF inlet shroud 44 are depicted in FIG. 4 and have a diameter D1 of about 0.406 inches (1.031 cm). Advantageously, the inner cooling holes 60 having a diameter D1 of about 0.406 inches (1.031 cm) achieves the appropriate amount of flow through the inner cooling holes 60 relative the outer cooling holes 62. The conical portion 76 includes a first angled wall 90 located opposite the recessed portion 80. The first angled wall 90 may be oriented at an angle θ1 of about 50° relative to the CLB. The first angled wall 90 includes a first reference point 92 that is located at a distance D2 of about 1.275 inches (3.239 cm) away from the CLB. The first reference point 92 is located on a second side 63 of the conical portion 76. The second side being opposite a first side 61 of the conical portion 76. The first reference point 92 of the angle wall 90 is located at a distance D3 of about 0.530 inches (1.346 cm) away from the inner RAF hub interface portion 72 as measured linearly along the RAF CLB. The first reference point 92 defines the location of the angled portion 90 relative to the radial face of 72 and the CLB by defining a point on the angled portion 90. Each of the inner cooling holes 60 includes a hole center line (CLC). The CLC is oriented at an angle θ2 of about 35° relative to the inner RAF hub interface portion 72. Advantageously, the CLC being oriented at an angle θ2 of about 35° relative to the inner RAF hub interface portion 72 achieves increased structural strength for the RAF inlet shroud 44.

Referring now to FIG. 4 with continued reference to FIGS. 1-3. FIG. 4 is an enlarged view of the sectional view of FIG. 1. FIG. 4 illustrates the RAF inlet shroud 44 about a RAF CLB along the axial center 82 of the RAF inlet shroud 44 proximate the central portion 78. The conical portion 76 includes a second angled wall 96 located on the first side 61 of the conical portion 76. The second angle wall 96 is located on a side of the RAF inlet shroud 44 that includes the recessed portion 80. The second angled wall 96 includes second reference point 94 that is located at a distance D4 of about 0.7 inches (1.778 cm) away from the CLB. The second reference point 94 is located on the first side 61 of the conical portion 76 on a second angled wall 96. The first side 61 being opposite the second side 63 of the conical portion 76. The second reference point 94 is located at a distance D5 of about 0.530 inches (1.346 cm) away from the inner RAF hub interface portion 72 as measured linearly along the RAF CLB. The second reference point 94 defines the location of the conical portion 76 relative to the radial face of 72 and the CLB by defining a point on the conical portion 76. The second angled wall 96 may be oriented at an angle θ3 of about 55° relative to the CLB at the second reference point 94. The central portion 78 is located at a distance D6 of about 0.625 inches (1.588 cm) away the inner RAF hub interface portion 72. An outlet 68 of the inner cooling hole 60 is located at a distance D7 of about 0.785 inches (1.994 cm) away from the inner RAF hub interface portion 72 as measured linearly along the RAF CLB. The second side 63 at the outlet 68 may be about parallel to the inner RAF hub interface portion 72.

The RAF inlet shroud 44 may include a first fillet radius R1 located on the first side 61 of the conical portion 76. The first fillet radius R1 may be about 0.350 inches (0.889 cm). The RAF inlet shroud 44 may include a second fillet radius R2 located on the first side 61 of the conical portion 76. The second fillet radius R2 may be about 0.090 inches (0.229 cm). The RAF inlet shroud 44 may include a third fillet radius R3 located on the second side 63 of the conical portion 76. The third fillet radius R3 may be about 0.120 inches (0.305 cm). Each fillet radius R1, R2, R3 is sized to achieve increased structural strength for the RAF inlet shroud 44.

Figure 5:
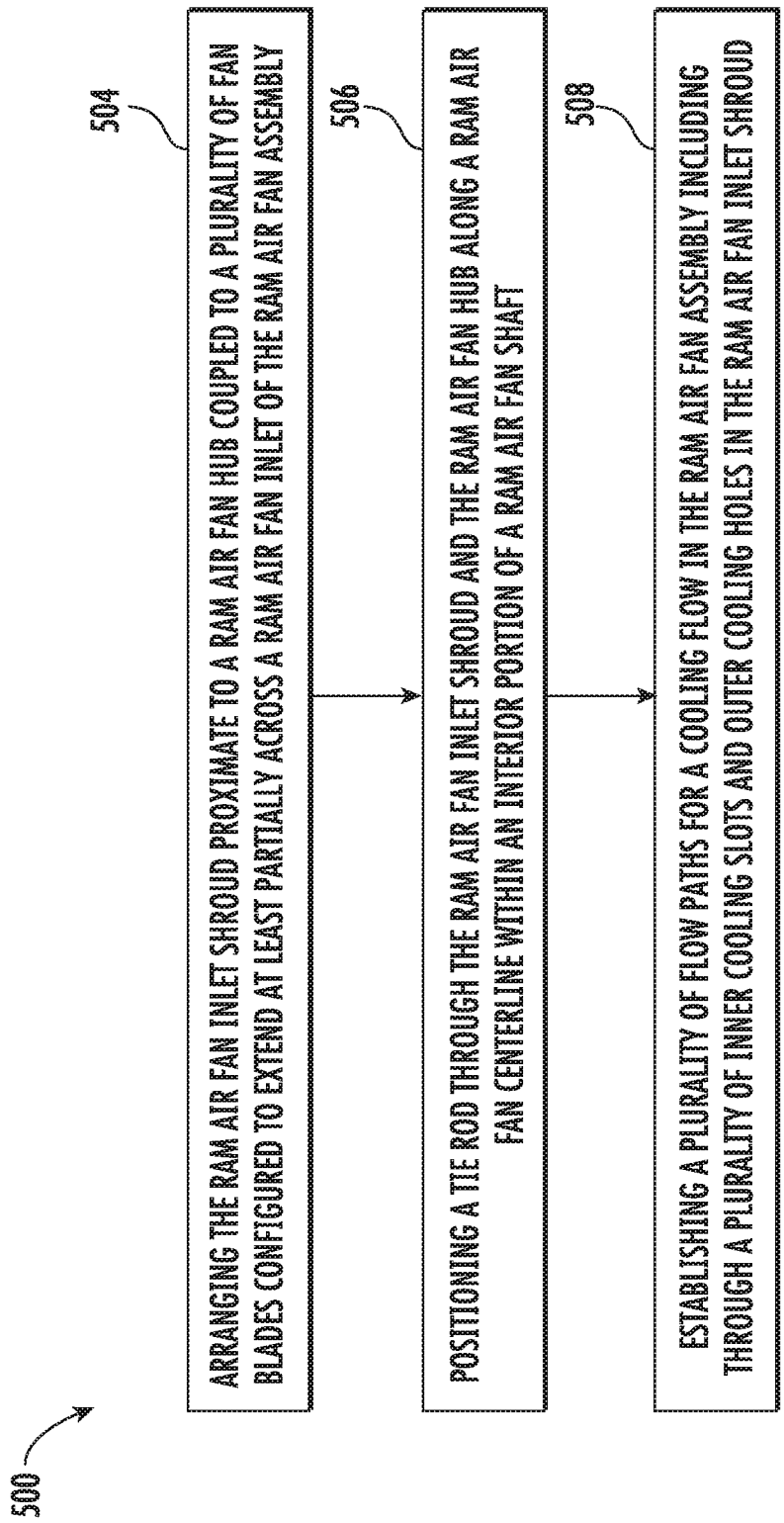
FIG. 5 is a diagram of a method installing a ram air fan inlet shroud in a ram air fan assembly, showing operations of the method, according to an embodiment of the present disclosure.

Referring now to FIG. 5, with continued reference to FIGS. 1-4. FIG. 5 shows a method 500 of installing a ram air fan inlet shroud 44 in a ram air fan assembly 10. At block 504, a ram air fan inlet shroud 44 is arranged proximate to a ram air fan hub 38 coupled to a plurality of fan blades 40 configured to extend at least partially across a ram air fan inlet 14 of the ram air fan assembly 10. At block 506, a tie rod 48 is positioned through the ram air fan inlet shroud 44 and the ram air fan hub 38 along a ram air fan centerline CLB within an interior portion 46 of a ram air fan shaft 22. When the tie rod 48 is positioned and within the ram air fan hub 38, a preload is applied to the tie rod 48 in order to secure rotative assembly together as if it was a single part. Advantageously, the dimensions discussed above (i.e. D1-D7 and θ1-θ3) allow preload to be applied the ram air fan inlet shroud 44 without damage. At block 508, a plurality of flow paths 50 is established for a cooling flow 32 in the ram air fan assembly 10 including through a plurality of inner cooling holes 60 and outer cooling holes 62 in the ram air fan inlet shroud 44.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ram air fan inlet shroud for a ram air fan assembly of an aircraft, the ram air fan inlet shroud comprising:
   a shroud portion extending outwardly from a conical portion, the conical portion providing a transition between a central portion and an inner ram air fan hub interface portion, the conical portion comprising a plurality of inner cooling holes, wherein a diameter of each of the plurality of inner cooling holes is about 0.406 inches (1.031 cm);
   a recessed portion located between the inner ram air fan hub interface portion and an outer ram air fan hub interface portion, the recessed portion comprising a plurality of outer cooling holes; and
   a first angled wall within the conical portion, the first angled wall being located opposite the recessed portion,
   wherein both the plurality of inner cooling holes and the plurality of outer cooling holes pass through the first angled wall of the conical portion.

2. The ram air fan inlet shroud of claim 1, wherein each of the plurality inner cooling holes includes a hole centerline oriented at an angle of about 35° relative to the inner ram air fan hub interface portion.

3. The ram air fan inlet shroud of claim 1, further comprising:
   a ram air fan inlet shroud centerline, wherein the first angled wall is oriented at an angle of about 50° relative to the ram air fan inlet shroud centerline.

4. The ram air fan inlet shroud of claim 1, further comprising:
   a ram air fan inlet shroud centerline; and
   a first reference point located on the first angled wall at a distance of about 1.275 inches (3.239 cm) away from the ram air fan inlet shroud centerline.

5. The ram air fan inlet shroud of claim 1, further comprising:
   a ram air fan inlet shroud centerline; and
   a first reference point located on the first angled wall at a distance of about 0.530 inches (1.346 cm) away from the inner ram air fan hub interface portion as measured linearly along ram air fan inlet shroud centerline.

6. The ram air fan inlet shroud of claim 1, further comprising:
   a ram air fan inlet shroud centerline;
   a second angled wall within the conical portion, the second angled wall being located on a side of the ram air fan inlet shroud that includes the recessed portion; and
   a second reference point located on the second angled wall, wherein the second angled wall at the second reference point is oriented at an angle of about 55° relative to the ram air fan inlet shroud centerline.

7. The ram air fan inlet shroud of claim 1, further comprising:
   a ram air fan inlet shroud centerline;
   a second angled wall within the conical portion, the second angled wall being located on a side of the ram air fan inlet shroud that includes the recessed portion; and
   a second reference point located on the second angled wall, wherein the second reference point is located at a distance of about 0.550 (1.397 cm) away from the inner ram air fan hub interface portion as measured linearly along the ram air fan inlet shroud centerline.

8. The ram air fan inlet shroud of claim 1, wherein each of the plurality inner cooling holes further comprises:
   a ram air fan inlet shroud centerline; and
   an outlet located in the conical portion,
   wherein the outlet is located at a distance of about 0.785 inches (1.994 cm) away from the inner ram air fan hub interface portion as measured linearly along the ram air fan inlet shroud centerline.

9. The ram air fan inlet shroud of claim 1, wherein the central portion is located at a distance of about 0.625 inches (1.588 cm) away from the inner ram air fan hub interface portion.

10. The ram air fan inlet shroud of claim 1, further comprising:
    a ram air fan inlet shroud centerline;
    a second angled wall within the conical portion; and
    a second reference point located on the second angled wall, wherein the second reference point is located at a distance of about 0.7 inches (1.778 cm) away from the ram air fan inlet shroud centerline.

11. A ram air fan assembly comprising:
a ram air fan disposed at a fan inlet, the ram air fan comprising a ram air fan hub coupled to a plurality of fan blades;
a ram air fan motor operably connected to the ram air fan; and
a ram air fan inlet shroud disposed proximate to the ram air fan hub, the ram air fan inlet shroud comprising:
a shroud portion extending outwardly from a conical portion, the conical portion providing a transition between a central portion and an inner ram air fan hub interface portion, the conical portion comprising a plurality of inner cooling holes, wherein a diameter of each of the plurality of inner cooling holes is about 0.406 inches (1.031 cm); and
a recessed portion located between the inner ram air fan hub interface portion and an outer ram air fan hub interface portion, the recessed portion comprising a plurality of outer cooling holes; and
a first angled wall within the conical portion, the first angled wall being located opposite the recessed portion,
wherein both the plurality of inner cooling holes and the plurality of outer cooling holes pass through the first angled wall of the conical portion.

12. The ram air fan assembly of claim 11, wherein each of the plurality inner cooling holes includes a hole centerline oriented at an angle of about 35° relative to the inner ram air fan hub interface portion.

13. The ram air fan assembly of claim 11, further comprising:
a ram air fan inlet shroud centerline, wherein the first angled wall is oriented at an angle of about 50° relative to the ram air fan inlet shroud centerline.

14. The ram air fan assembly of claim 11, further comprising:
a ram air fan inlet shroud centerline; and
a first reference point located on the first angled wall at a distance of about 1.275 inches (3.239 cm) away from the ram air fan inlet shroud centerline.

15. The ram air fan assembly of claim 11, further comprising:
a ram air fan inlet shroud centerline; and
a first reference point located on the first angled wall at a distance of about 0.530 inches (1.346 cm) away from the inner ram air fan hub interface portion as measured linearly along the ram air fan inlet shroud centerline.

16. The ram air fan assembly of claim 11, further comprising:
a ram air fan inlet shroud centerline;
a second angled wall within the conical portion, the second angled wall being located on a side of the ram air fan inlet shroud that includes the recessed portion; and
a second reference point located on the second angled wall, wherein the second angled wall at the second reference point is oriented at an angle of about 55° relative to the ram air fan inlet shroud centerline.

17. The ram air fan assembly of claim 11, further comprising:
a ram air fan inlet shroud centerline;
a second angled wall within the conical portion, the second angled wall being located on a side of the ram air fan inlet shroud that includes the recessed portion; and
a second reference point located on the second angled wall, wherein the second reference point is located at a distance of about 0.550 (1.397 cm) away from the inner ram air fan hub interface portion as measured linearly along the ram air fan inlet shroud centerline.

18. The ram air fan assembly of claim 11, wherein each of the plurality inner cooling holes further comprises:
a ram air tan inlet shroud centerline; and
an outlet located in the conical portion,
wherein the outlet is located at a distance of about 0.785 inches (1.994 cm) away from the inner ram air fan hub interface portion as measured linearly along ram air fan inlet shroud centerline.

19. The ram air fan assembly of claim 11, wherein the central portion is located at a distance of about 0.625 inches (1.588 cm) away from the inner ram air fan hub interface portion.

20. A method of installing a ram air fan inlet shroud in a ram air fan assembly comprising:
arranging the ram air fan inlet shroud proximate to a ram air fan hub coupled to a plurality of fan blades configured to extend at least partially across a ram air fan inlet of the ram air fan assembly;
positioning a tie rod through the ram air fan inlet shroud and the ram air fan hub along a ram air fan centerline within an interior portion of a ram air fan shaft; and
establishing a plurality of flow paths for a cooling flow in the ram air fan assembly including through a plurality of inner cooling holes and outer cooling holes in the ram air fan inlet shroud, wherein the ram air fan inlet shroud further comprises:
a shroud portion extending outwardly from a conical portion, the conical portion providing a transition between a central portion and an inner ram air fan hub interface portion, the conical portion comprising the plurality of inner cooling holes, wherein a diameter of each of the plurality of inner cooling holes is about 0.406 inches (1.031 cm);
a recessed portion located between the inner ram air fan hub interface portion and an outer ram air fan hub interface portion, the recessed portion comprising a plurality of outer cooling holes; and
a first angled wall within the conical portion, the first angled wall being located opposite the recessed portion,
wherein both the plurality of inner cooling holes and the plurality of outer cooling holes pass through the first angled wall of the conical portion.

* * * * *